United States Patent
Beyrle et al.

(10) Patent No.: US 6,498,117 B1
(45) Date of Patent: Dec. 24, 2002

(54) PROCESS FOR MANUFACTURING A RECYCLABLE ZINC-CONTAINING BLACK ENAMEL COMPOSITION

(75) Inventors: André Beyrle, Tracy le Val (FR); Daniel Dages, Les Mureaux (FR)

(73) Assignee: Saint-Gobain Vitrage, Courbervoie (FR)

( * ) Notice: Subject to any disclaimer, the term of this patent is extended or adjusted under 35 U.S.C. 154(b) by 0 days.

(21) Appl. No.: 09/612,316

(22) Filed: Jul. 7, 2000

(30) Foreign Application Priority Data

Jul. 8, 1999 (FR) .............................. 99 08833

(51) Int. Cl.⁷ .............................. C03C 8/22; C03C 8/04
(52) U.S. Cl. ........................................... 501/16; 501/26
(58) Field of Search ........................ 427/376.2; 501/26, 501/21, 16

(56) References Cited

U.S. PATENT DOCUMENTS 5,244,848 A * 9/1993 Clifford et al. ............... 501/66
5,439,852 A 8/1995 Hormadaly ................... 501/26
6,105,394 A * 8/2000 Sridharan et al. ............. 65/33.6

FOREIGN PATENT DOCUMENTS

| FR | 2 495 190 | 6/1982 |
| GB | 2 092 123 | 8/1982 |
| WO | WO 98/25864 | 6/1998 |

* cited by examiner

*Primary Examiner*—Katherine A. Bareford
(74) *Attorney, Agent, or Firm*—Pennie & Edmonds LLP

(57) ABSTRACT

The present invention relates to a process for manufacturing recyclable black enamels that contain at least zinc, in which process glass forming materials comprising at least bismuth, silicon, boron and manganese are melted, at temperatures greater than about 900° C., and then a glass frit comprising at least zinc is added to the mixture obtained after this direct melting. The invention also relates to zinc-based recyclable black enamel compositions.

9 Claims, No Drawings

PROCESS FOR MANUFACTURING A RECYCLABLE ZINC-CONTAINING BLACK ENAMEL COMPOSITION

FIELD OF THE INVENTION

The present invention relates to the deposition of enamel on a glass substrate, especially on glazing. In particular, it relates to a novel enamel composition and to the process for obtaining it, a process for manufacturing an enamelled layer on a glass substrate, and the enamelled products obtained, particularly enamelled glazing.

BACKGROUND OF THE INVENTION

Enamels are well known in the prior art and are used, especially, for coating glass substrates, such as glazing in the motor-vehicle industry or the building industry. They make it possible to form decorative layers or inscriptions, conductive layers, protective layers, especially layers for protecting the adhesive layers or adhesive beads intended for mounting glazing in body openings from ultraviolet radiation, masks, especially masks for concealing current-collecting strips of heating grids or for concealing the above mentioned adhesive beads and similar products.

Before application to the substrate and firing, these enamels used for coating glass substrates are generally formed from a powder comprising a glass frit, which is included to provide a glassy matrix, and pigments, which are used as colorants. The pigments also possibly form part of the frit. Both the frit and the pigments are generally based on metal oxides. Also, a medium or "vehicle" is used to allow application and temporary adhesion of the enamel to a substrate. The medium, chosen according to the intended use of the enamel, must ensure that the particles of the frits and pigments used are properly in suspension and must be consumed at the latest during firing of the enamel. This medium may include solvents, diluents, oils, resins and the like.

One problem with existing enamelled glass substrates is the difficulty of recycling such products, particularly in the manufacture of glass substrates in the form of sheets or glazings. Since such products must meet many requirements in terms of coloration, light and/or energy transmission, etc., it is important in fact that the glass waste reintroduced in ground form or cullet into the melting furnaces used for manufacturing new glazings does not disturb the glass compositions normally already present and does not give products that do not meet the necessary requirements. Although non-enamelled glass cullet can thus be reintroduced into a furnace for manufacturing float glass in amounts generally of about 20–30% by weight of the charge of the furnace, enamelled glass cullet, on the other hand, generally causes the appearance of undesirable residual colorations or of residual unmelted islands in the glass sheets formed. Consequently, the amount of enamelled glass cullet that can be reintroduced into these furnaces does not generally exceed 2 to 3% by weight of the charge of the furnaces. Usually, the enamelled glass cullet constitutes from 0.1 to 0.5% by weight of the charge.

An improved enamel composition and an enamelling process are already known from WO 98/25864, which makes it possible to obtain improved enamelled glass substrates, particularly enamelled substrates which can be recycled (especially in the manufacture of glazing) more easily than the existing enamelled substrates. This composition comprises as pigments one or more manganese compounds and has a firing temperature, also called melting point, of less than 750° C. In motor-vehicle applications, the composition is preferably chosen so as to obtain a black enamel having the following colorimetric coordinates, in absolute values:

$L^* \leq 5$; $|a^*| 2$ and $|b^*| \leq 2$ (and, preferably,
$|a^*| \leq 1$ and $|b^*| \leq 1$).

This is generally the case in the compositions described in the above document, which essentially comprise $Bi_2O_3$ as intermediate oxide. They are obtained either by adding the manganese compounds in the form of powder to a glass frit powder including $Bi_2O_3$, or by a process, called the "direct process," by melting a mixture of suitable raw materials (including the manganese compounds) in order to obtain the desired combination of frit and pigments.

On the other hand, the black coloration sought after in motor-vehicle applications is not obtained systematically with other types of recyclable compositions. In particular, tests carried, out by replacing all or some of the $Bi_2O_3$ with a less expensive oxide, such as zinc oxide, have not made it possible to obtain the desired black coloration, whether the $Bi_2O_3$ is replaced with a less expensive oxide in the glass frit powder before adding the manganese compounds in the first process described in the previous paragraph, or whether the raw material or materials used for obtaining $Bi_2O_3$ is or are replaced with one or more raw materials used for obtaining a less expensive oxide in the mixture of raw materials in the direct process described in the preceding paragraph.

Thus, there is a need to develop recyclable black enamel compositions which are less expensive than previous bismuth-based compositions. This need is satisfied by the present invention.

SUMMARY OF THE INVENTION

The enamel compositions provided by the invention are black enamel compositions, i.e., enamel compositions having a black color after firing, which are recyclable and comprise at least zinc.

Until now, such compositions were inconceivable due to the above mentioned coloration problems or due to recycling problems (less expensive compositions do exist but they cannot be recycled). The present invention has succeeded in developing such compositions by devising a particular process for obtaining an enamel, this process comprising the following steps of melting glass forming materials comprising at least bismuth, silicon, boron and manganese, at temperatures greater than 900° C., and then adding a glass frit comprising at least zinc to the mixture obtained after this direct melting.

In one embodiment of the invention, the process for manufacturing a recyclable zinc-containing black enamel composition comprises the steps of melting glass forming materials comprising at least bismuth, silicon, boron and manganese together at temperatures greater than about 900° C. to form a first mixture; and then adding a glass frit comprising at least zinc to the first mixture to obtain a second mixture that can be applied to form an enamel coating.

In the process, the melting step can be carried out above about 1050° C. Glass frit containing no pigments, and optionally with a medium, is added to the first mixture. The zinc-based glass frit can be added in an amount sufficient to represent about 20% to about 55% by weight of the second mixture. The process may further comprise grinding the first mixture before the zinc-based glass frit is added thereto.

Enamel compositions can be obtained by the above described process. Preferably, the enamel compositions are essentially free of chromium, copper, nickel or cobalt and may further comprise a medium.

The enamel compositions may comprise a mixture of a first composition obtained by melting glass forming materials comprising at least bismuth, silicon, boron and manganese at temperatures greater than about 900° C. and a second composition in the form of at least one glass frit comprising at least zinc. The enamel compositions may further comprise a medium.

In another embodiment of the invention, a glass substrate may be enamelled wherein at least part of a glass substrate is at least partially coated with an enamel composition as described above, and then the substrate is subjected to a heat treatment so as to bake the enamel composition thereon and form an enamel coating. The invention may also include glazings comprising at least one glass sheet coated, on at least part of at least one side, with at least one layer of an enamel having a composition as described above.

DETAILED DESCRIPTION OF THE INVENTION

The raw materials used in the process according to the invention may be natural materials, for example, sand, colemanite, etc., or synthetic materials, for example, $Bi_2O_3$, etc. The bismuth, silicon, boron and manganese provided by the raw materials used generally are in the form of salts (nitrate, carbonate, etc.) and/or of oxides. The glass forming materials used in the process of the invention make it possible to obtain, after melting, a mixture or frit based on bismuth, silicon and boron. The elements are essentially present and are expressed hereinafter in the compositions in the form of the following oxides, respectively: $Bi_2O_3$, $SiO_2$ and $B_2O_3$. Likewise, each other compound in these compositions will be expressed hereafter in its form commonly present, analyzed and expressed in these enamel frits or compositions. The inventive mixtures also include at least one manganese compound as pigment(s).

Preferably, the manganese compound or compounds present in the above mentioned mixture (hereafter simply called "the mixture" or "the primary composition") form the main pigments of the mixture, it being optionally possible for this mixture to include one or more other pigments, but in small amounts (amounts which remain, in particular, for each other optional pigment, less than the amount of manganese compound(s)). Advantageously, the manganese compound or compounds represent at least about 50% by weight of the pigments present, preferably at least about 75% by weight of the pigments present, and particularly preferably are the only pigments present in the mixture. In particular, and so as to obtain a composition according to the invention having good recyclability, this mixture advantageously contains no chromium oxides, copper oxides, cobalt oxides or nickel oxides and also contains no other chromium-, copper-, cobalt- or nickel-based compounds, such as copper chromates, cobalt chromates, etc. Preferably, it also contains no other coloring oxides, such as iron oxides. The amount of pigment(s) in the mixture is generally from about 20% to about 50% by weight of the mixture.

The manganese compound or compounds are generally provided in the form of manganese salt(s) and/or manganese oxide(s), for example, $MnO_2$ and/or $Mn_2O_3$ and/or $Mn_3O_4$ and/or MnO, and are preferably provided in the form of manganese carbonate(s) and/or of $MnO_2$.

In most cases, the raw materials used in the process according to the invention comprise, in addition to the compounds already mentioned, one or more alkalis (for example, sodium carbonate and/or sodium nitrate) and alumina. Preferably, the raw materials used are chosen so as to obtain the following mixture after melting, the proportions being expressed in percentages by weight:

| | |
|---|---|
| $Bi_2O_3$ | 28–52% |
| $SiO_2$ | 8–32% |
| $B_2O_3$ | 1–10% |
| $Al_2O_3$ | 0.1–4% |
| alkaline oxides (usually $Na_2O$ and/or $K_2O$) | 0.2–6% |
| $MnO_2$ | 20–50% |

The raw materials in the process according to the invention are preferably melted at temperatures greater than about 1050° C. or even greater than about 1100° C. the fulfilment of this condition making it possible to obtain the desired black coloration directly during the subsequent firing of the enamel, without the need for an additional heat treatment of the mixture, such as an annealing treatment. On the other hand, such an additional heat treatment of the mixture may be desirable if the direct melting is carried out at temperatures of less than about 1050° C., i.e., to say mainly between about 900° C. and about 1050° C., in the process according to the invention. The annealing taking place, 30 for example, at temperatures from about 480° C. to about 550° C. or even as high as about 650° C., before adding the frit comprising at least zinc, and being conducive, if necessary, in this case, to the appearance of the black coloration. The melting point of the raw materials in the process according to the invention is therefore chosen to be greater than about 900° C., preferably greater than about 1050° C., and as a general rule does not exceed about 1300° C.

The mixture obtained after melting the raw materials is then generally ground into powder form, the addition of the glass frit comprising at least zinc (called hereafter zinc-based glass frit) to the mixture preferably taking place after this grinding (the zinc-based frit then also being preferably provided in powder form). In a variant, the zinc-based frit (obtained by direct melting or already in powder form) may be added to the mixture before the zinc-based frit/mixture combination is ground.

Preferably, the grinding carried out is fine grinding so that at least about 90% by weight of the particles forming the powder have a diameter of less than about 40 $\mu$m, preferably less than about 20 $\mu$m and particularly preferably less than about 10 $\mu$m (this fine grinding making it possible to obtain better results in terms of opacity of the enamel). Where appropriate, the final powder comprising the ground mixture and the ground zinc-based frit is then put into paste form in a medium, for deposition on a surface to be coated and final firing of the enamel. In a variant, the zinc-based frit has already been put into paste form in a medium while being combined with the mixture.

In the process according to the invention, two particular separate compositions are thus combined at a very particular moment in the process. A first composition is made of the mixture and a second composition includes at least the zinc-based glass frit. This combining of particular compositions is carried out under such conditions that make it possible to obtain a particularly inexpensive composition, particularly with respect to a composition comprising only $Bi_2O_3$ as intermediate oxide, while still remaining as a recyclable composition. It also makes it possible to obtain the desired reproducible black coloration in motor-vehicle applications, such a black coloration not being obtained when the combining is carried out in a different manner. Preferably, the composition added to the mixture (this composition being called above second composition) essentially includes the zinc-based glass frit, whether in a medium or not, and especially contains no pigments, as the addition of pigments to the mixture/zinc-based frit combination possibly can be prejudicial to the formation of the black color or to the recyclability of the enamel obtained. The composition added to the mixture particularly contains no manganese compounds and, like for the mixture, contains no chromium oxides, copper oxides, cobalt oxides or nickel oxides nor any other compound based on chromium, copper, cobalt, nickel or possibly iron.

Preferably, the zinc-based glass frit is added to the mixture so as to represent about 20% to about 55% by weight of the mixture/zinc-based glass frit combination. Generally, the zinc-based glass frit comprises, apart from zinc (present as intermediate oxide and expressed in ZnO form), other oxides such as $B_2O_3$ or $SiO_2$.

In a preferred embodiment of the present invention, the zinc-based glass frit has, for example, the following composition, expressed in percentages by weight:

| | |
|---|---|
| ZnO | 18–30% |
| $SiO_2$ | 16–50% |
| $B_2O_3$ | 10–25% |
| $Al_2O_3$ | 1–4% |
| F | 0–5% |
| alkaline oxides (usually $Na_2O$ and/or $K_2O$ | 6–15% |
| $TiO_2$ | 0–8% |

The enamel composition thus obtained in the process according to the invention is a recyclable black enamel composition comprising at least zinc, as defined according to the invention. The composition according to the invention may also be defined as an enamel composition containing no chromium, copper, nickel, cobalt or possibly iron compounds; this composition comprising zinc and being able to give a black coloration ($L^* \leq 5$; $|a^*| \leq 2$ and $|b^*| \leq 2$) after firing. The composition according to the invention may particularly and advantageously be obtained by the process according to the invention.

The enamel composition according to the invention generally comprises a mixture of oxides (frit), including at least ZnO. The expression "enamel composition" should be understood according to the invention to mean the composition of the enamel in question before it is fired, the enamel after firing essentially being in the form of a colored glassy matrix.

In general, the enamel composition according to the invention also includes other oxides, particularly $Bi_2O_3$ and $MnO_2$, as well as silicon oxide $SiO_2$ acting as a network-forming oxide, aluminum oxide and boron oxide, and possibly other oxides such as sodium, lithium, potassium, calcium, magnesium or titanium oxides, or the like. Preferably, the composition according to the invention, obtained particularly according to the process of the invention, has the following composition, expressed in percentages by weight:

| | |
|---|---|
| ZnO | 4–8% |
| $Bi_2O_3$ | 16–35% |

-continued

| | |
|---|---|
| $SiO_2$ | 20–27% |
| $B_2O_3$ | 6–10% |
| $Al_2O_3$ | 1–4% |
| F | 1–0.5% |
| $TiO_2$ | 0–1% |
| alkaline oxides (usually $Na_2O$ and/or $K_2O$) | 4–6% |
| $MnO_2$ | 22–38% |

Preferably, for reasons associated in particular with recycling, the composition includes less than 1%, advantageously less than about 0.1% and preferably less than about 0.05% by weight of lead oxides. It is most preferred that no lead oxides are present. Also, the composition preferably contains no other problematic elements, such as cadmium oxides, chromium, copper, nickel, cobalt or iron elements as mentioned above.

In an advantageous embodiment of the invention, the enamel composition furthermore comprises less than about 10% by weight and preferably less than about 5% by weight of silver particles and, more generally, comprises less than about 10% of any silver-based compound or any conductive particles.

As already mentioned above, the enamel composition according to the invention may comprise a medium which allows the composition to have the desired viscosity for application to the substrate and allows it to bond to the substrate. This medium may be any medium normally used in conventional enamel compositions and may especially include solvents, diluents, oils such as pine oils and other vegetable oils, resins such as acrylic resins, petroleum fractions, film-forming materials such as cellulosic materials, etc. The proportion of medium in the composition ready to be deposited is preferably from about 15% to about 40% by weight of the composition.

The enamel composition according to the invention also advantageously has a firing temperature (or melting point) of less than about 700° C., for example, from about 550° C. to about 650° C. In the process according to the invention, the raw materials and the zinc-based frit used are, in particular, chosen so as to preferably obtain a composition having this firing temperature. The expression "firing temperature of the enamel composition" should be understood according to the invention to mean the firing temperature of the enamel in its form as deposited on the substrate to be coated. It corresponds, in the field of enamels, to the minimum temperature at which "sufficient" sintering of the composition is observed, this "sufficient" sintering being especially manifested by the disappearance of the capillary effect of the enamel during sintering. A person skilled in the art knows how to measure this melting point, for example by passing an inked pen (e.g. more specifically a felt) over the enamel after the latter has been raised to a treatment temperature and then cooled and then by noting the lowest treatment temperature for which the trace, left across the cooled enamel by the solvents of the ink when they are absorbed by the enamel by capillary effect, disappears. In the production of an enamelled substrate, the temperature chosen for firing the enamel deposited on the substrate is then preferably chosen to be greater than or equal to this firing temperature.

In the process for enamelling glass substrates, especially glazings, using the composition according to the invention, the enamel composition is fired after it has been deposited on a substrate. The firing, where appropriate, takes place during the heat treatment associated with the bending and/or toughening of the substrates. Generally, the firing temperatures range from about 550° C. to about 700–750° C. and the firing time preferably does not exceed a few minutes. Preferably, any heat treatment carried out on the enamel composition according to the invention or on the mixture/ zinc-based frit combination obtained in the process according to the invention does not exceed about 700° C. in temperature and does not exceed a few minutes or tens of minutes. At most, a time of one hour may be used. More substantial heat treatments can possibly cause degradation of the black coloration. The fulfilment of these conditions is not prejudicial to the processing of the enamel according to the invention, however, it being possible for this enamel to be advantageously processed using the devices and under the temperature and pressure conditions normally employed for processing conventional enamels, especially those used in motor-vehicle applications.

The enamel composition may be deposited on a substrate by screen printing, by sputtering, by curtain or roll coating, or by other conventional processes. The deposition is generally followed by drying, for example using infrared light, in order to temporarily fix the enamel by removal of the diluents of the medium used for applying the enamel to the substrate. If several layers are deposited on the substrate, each layer is preferably dried before the next layer is deposited, the firing taking place on the multilayer assembly.

The optional bending and toughening of the glass substrates are carried out using known methods. The bending may especially be carried out by gravity, especially the bending of glass substrates in pairs for the purpose of producing laminated glass sheets, or by means of dies and, when the substrates are bent and toughened, the toughening may be carried out after bending the enamelled substrates, optionally within the same device.

If glass substrates have to be bent simultaneously, for the purpose of producing laminated glazings, the enamel is deposited on at least one of the substrates and the substrates are joined together and then bent. The glass substrates are then separated in order to insert at least one interlayer film of different material. The laminated glazing may be obtained by joining the assembly together by hot pressing.

The enamel obtained after firing exhibits good opacity, with an optical density of the enamel generally being greater than 2.5. The optical density (OD) is measured with a densitometer, for example the GRETAG® D200 apparatus in which a 550 nm filter is used and is related to the light transmission factor $T_L$ by the equation:

$$OD = \log 1/T_L$$

Moreover, regardless the initial color of the enamel composition according to the invention before firing, a black enamel of the type required for motor-vehicle applications is obtained after firing. Preferably, the enamel composition according to the invention is chosen so as to give, after firing, a black enamel having the following colorimetric coordinates, in absolute values:

$L^* \leq 5$; $|a^*| \leq 1$ (and, preferably, $|a^*| \leq 0.6$) and $|b^*| \leq 2$ (and, preferably, $|b^*| \leq 1$).

The colorimetric coordinates L*, a* and b* were defined and proposed in 1931 by the CIE (Commission Internationale de l'Eclairage [International Illumination Commission]) and have formed the subject of an official CIE recommendation in 1976 (International Illumination Commission, Colorimetry—Official Recommendations— CIE Publication No. 15-2, Vienna, 1986). The above mentioned calorimetric coordinates are measured in reflection, using a Minolta CM 2002 spectrocolorimeter, under illuminant $D_{65}$ at an angle of observation of 10° and in specular excluded mode, for the enamel when on an untinted glass substrate having a light transmission factor of about 90% and a thickness of 4 mm.

The substrates coated with the enamel according to the invention also exhibit, especially because of the use of the manganese compound or compounds as all or some of the pigments, better recyclability. Thus, when the substrates coated with the enamel having the composition according to the invention are reintroduced, in cullet form, into a furnace for melting raw materials for the production of glass sheets (at temperatures generally of about 1350° C. to about 1500° C.), the coloration of the enamel generally disappears and does not interfere with the coloration of the glass resulting from the raw materials used. The recyclability of the composition according to the invention is particularly good when the composition contains about 1% or less of problematic components such as lead, chromium, copper, cobalt, nickel, iron, cadmium, silver or other conductive particles.

The enamel composition according to the invention can be used to coat various substrates. The substrate on which the enamel composition is deposited may be a bare glass substrate or a glass substrate already coated with one or more layers of enamel, preferably with one or more layers of enamel according to the invention. This substrate may consist of one or more glass sheets and may be toughened so as to have improved mechanical strength and heat resistance properties. The substrate coated with enamel according to the invention thus comprises at least one glass sheet coated on at least part of one of its sides with at least one layer of an enamel having a composition according to the invention. The enamel according to the invention may also be used to coat other types of substrate.

The glass substrates, especially glazing, coated with enamel according to the invention exhibit improved recyclability, these substrates generally being recyclable, especially in the form of cullet, in furnaces for manufacturing glass sheets, particularly in the most widely used furnaces for the manufacture of glass sheets by the float process, with amounts possibly ranging up to at least about 15%, or even at least about 50%, by weight of the charge of the furnaces with the enamel generally constituting from about 0.1% to about 0.5% by weight of the glass cullet. The substrates coated with enamel according to the invention furthermore have mechanical properties sufficient for them to be used in motor-vehicle applications.

EXAMPLES

Further advantages and characteristics of the invention will appear in the following examples, which illustrate the present invention without, however, limiting it.

Example 1

A mixture of glass forming raw materials based on sodium carbonate, alumina, boric acid, silica, bismuth oxide and $MnO_2$ (or manganese carbonate) is melted at approximately 1200° C., this melting being followed by grinding. The mixture obtained has the following composition by weight: 7.7% $B_2O_3$, 45.5% $Bi_2O_3$, 12.2% $SiO_2$, 1.8% $Na_2O$, 2.8% $Al_2O_3$ and 30% $MnO_2$; to 75 parts by weight of the mixture obtained are then added 25 parts by weight of the following composition (percentages by weight): 45.2% $SiO_2$, 2.6% $Al_2O_3$, 14.6% $Na_2O$, 11.7% $B_2O_3$, 4.6% $TiO_2$, 0.8% F and 20.5% ZnO.

This combination of compositions is added to 27 parts of a pine-oil-based medium which includes 3% by weight of an acrylic resin, so as to obtain an enamel composition ready to be deposited on a substrate. Next, the composition is deposited on a glass sheet and then fired for a few minutes at 620–640° C. approximately. A substrate coated with a black enamel layer having an optical density of 2.5 and the following colorimetric coordinates: $L^*=2.7$; $a^*=0.4$ and $b^*=0.5$ (these coordinates being measured when the enamel is on a glass substrate having a light transmission factor of about 90% and a thickness of 4 mm) is obtained.

Next, the substrate is ground and introduced into a furnace for melting raw materials for the production of glass sheets by the float process, the substrate representing 50% by weight of the charge of the furnace (and the enamel representing 0.5% by weight of this substrate). The temperature of the furnace is about 1500° C. A glass devoid of any coloration and containing no batch stone is obtained on leaving the furnace.

In addition, compared with the same recyclable composition based only on bismuth as intermediate oxide, the composition obtained in this example is much less expensive.

Example 2

A mixture of glass forming raw materials based on sodium carbonate, alumina, boric acid, silica, bismuth oxide and $MnO_2$ (or manganese carbonate) is melted at approximately 1200° C., this melting being followed by grinding. The mixture obtained has the following composition by weight: 7.7% $B_2O_3$, 35.5% $Bi_2O_3$, 12.2% $SiO_2$, 1.8% $Na_2O$, 2.8% $Al_2O_3$ and 40% $MnO_2$; to 40 parts by weight of the mixture obtained are then added 13 parts by weight of the following composition (percentages by weight): 45.2% $SiO_2$, 2.6% $Al_2O_3$, 14.6% $Na_2O$, 11.7% $B_2O_3$, 4.6% $TiO_2$, 0.8% F and 20.5% ZnO One hundred parts by weight of this combination of compositions are then added to 27 parts of a pine-oil-based medium which includes 3% by weight of an acrylic resin, so as to obtain an enamel composition ready to be deposited on a substrate. Next, the composition is deposited on a glass sheet and then fired for a few minutes at approximately 630–650° C. A substrate coated with a black enamel layer having an optical density of 2.7 and the following colorimetric coordinates: $L^*=4$; $a^*=0.3$ and $b^*=0.5$ is obtained.

Next, the substrate is ground and introduced into a furnace for melting raw materials for the production of glass sheets by the float process, the substrate representing 50% by weight of the charge of the furnace (and the enamel representing 0.5% by weight of this substrate). The temperature of the furnace is about 1500° C. A glass devoid of any coloration and containing no batch stone is obtained on leaving the furnace.

As previously, compared with the same recyclable composition based only on bismuth as intermediate oxide, the composition obtained in this example is much less expensive.

Comparative Example 1

35 parts of a frit comprising (by weight) 11% $B_2O_3$, 65% $Bi_2O_3$, 17.4% $SiO_2$, 2.6% $Na_2O$ and 4% $Al_2O_3$ are mixed with 35 parts of a frit of the following composition; 45.2% $SiO_2$, 2.6% $Al_2O_3$, 14.6% $Na_2O$, 11.7% $B_2O_3$, 4.6% $TiO_2$, 0.8% F and 20.5% ZnO, and then 30 parts by weight of $MnO_2$ are added.

One hundred parts by weight of this combination of compositions are then added to 27 parts of a pine-oil-based medium which includes 3% by weight of an acrylic resin, so as to obtain an enamel composition ready to be deposited on a substrate. Next, the composition is deposited on a glass sheet and then fired for a few minutes at approximately 650° C. A substrate coated with a brown enamel layer having an optical density of 1.4 and the following calorimetric coordinates; $L^*=17.7$; $a^*=3.0$ and $b^*=6.4$ is obtained. These coordinates were measured when the enamel was on a glass substrate having a light transmission factor of about 90% and a thickness of 4 mm.

Comparative Example 2

Direct melting of the raw materials as in Example 1 is carried out, replacing some of the raw materials providing bismuth with raw materials providing zinc, so as to obtain a mixture close to that obtained in Example 1 but with some of the $Bi_2O_3$ replaced with ZnO, this melting being followed by grinding.

One hundred parts by weight of this mixture are then added to 27 parts of a pine-oil-based medium which includes 3% by weight of an acrylic resin, so as to obtain an enamel composition ready to be deposited on a substrate. Next, the composition is deposited on a glass sheet and then fired for a few minutes at approximately 650° C. A substrate coated with a brown enamel layer is obtained as in the previous comparative example.

The enamels according to the invention can be used especially for coating glazings for the motor-vehicle industry or the building industry.

What is claimed is:

1. A process for manufacturing a recyclable zinc-containing black enamel composition which comprises the steps of:

melting glass forming materials comprising at least $Bi_2O_3$ in an amount of 28 to 52 weight percent, $SiO_2$ in an amount of 8 to 32 weight percent, $B_2O_3$ in an amount of 1 to 10 weight percent, $Al_2O_3$ in an amount of 0.1 to 4 weight percent, alkaline oxides in an amount of 0.2 to 6 weight percent, and $MnO_2$ in an amount of 20 to 50 weight percent at temperatures greater than about 900° C. to form a first mixture;

cooling the first mixture; and then adding a glass frit comprising at least zinc oxide to the first mixture to obtain a second mixture that can be applied to form an enamel.

2. The process of claim 1, wherein the alkaline oxides comprise $Na_2O$, $K_2O$, and mixtures thereof.

3. A process for manufacturing a recyclable zinc-containing black enamel composition which comprises the steps of:

melting glass forming materials comprising at least bismuth, silicon, boron and manganese together at temperatures greater than about 900° C. to form a first mixture;

cooling the first mixture; and then adding a glass frit comprising ZnO in an amount of 18–30 weight percent, $SiO_2$ in an amount of 16 to 50 weight percent, $B_2O_3$ in an amount of 10 to 25 weight percent, $Al_2O_3$ in an amount of 1 to 4 weight percent, F in an amount of 0 to 4 weight percent, alkaline oxides in an amount of 6 to 15 weight percent, and $TiO_2$ in an amount of 0 to 8 weight percent to the first mixture to obtain a second mixture that can be applied to form an enamel coating.

4. The process of claim 3, wherein the alkaline oxides comprise $Na_2O$, $K_2O$, and mixtures thereof.

5. An enamel composition comprising a mixture of a first composition and a second composition, wherein the first composition is obtained by melting glass forming materials comprising $Bi_2O_3$ in an amount of 28 to 52 weight percent, $SiO_2$ in an amount of 8 to 32 weight percent, $B_2O_3$ in an amount of 1 to 10 weight percent, $Al_2O_3$ in an amount of 0.1 to 4 weight percent, alkaline oxides in an amount of 0.2 to 6 weight percent, and $MnO_2$ in an amount of to 50 weight percent at temperatures greater than about 900° C. to form a first mixture and then cooling the first mixture and the second composition is at least one glass frit comprising at least zinc oxide.

6. The enamel composition of claim 5, wherein the alkaline oxides comprise $Na_2O$, $K_2O$, and mixtures thereof.

7. An enamel composition comprising a mixture of a first composition and a second composition, wherein the first composition is obtained by melting glass forming materials comprising at least bismuth, silicon, boron and manganese at temperatures greater than about 900° C. to form a first mixture and then cooling the first mixture and the second composition is at least one glass frit comprising ZnO in an amount of 18–30 weight percent, $SiO_2$ in an amount of 16 to 50 weight percent, $B_2O_3$ in an amount of 10 to 25 weight percent, $Al_2O_3$ in an amount of 1 to 4 weight percent, F in an amount of 0 to 4 weight percent, alkaline oxides in an amount of 6 to 15 weight percent, and $TiO_2$ in an amount of 0 to 8 weight percent.

8. The enamel composition of claim 7, wherein the alkaline oxides comprise $Na_2O$, $K_2O$, and mixtures thereof.

9. An enamel composition comprising a mixture of a first composition and a second composition, wherein the first composition is obtained by melting glass forming materials comprising at least bismuth, silicon, boron, and manganese at temperatures greater than about 906° C. to form a first mixture and the second composition is at least one glass frit comprising at least zinc oxide, wherein the ZnO is present in an amount of 4–8 weight percent of the enamel composition, $Bi_2O_3$ is present in an amount of 16–35 weight percent of the enamel composition, $SiO_2$ is present in an amount of 20 to 27 weight percent of the enamel composition, $B_2O_3$ is present in an amount of 6 to 10 weight percent of the enamel composition, $Al_2O_3$ is present in an amount of 1 to 4 weight percent of the enamel composition, F is present in an amount of 0.5 to 1 weight percent of the enamel composition, alkaline oxides are present in an amount of 4 to 6 weight percent of the enamel composition, $TiO_2$ is present in an amount of 0 to 1 weight percent of the enamel composition, and $MnO_2$ is present in an amount of 22 to 38 weight percent of the enamel composition.

* * * * *

UNITED STATES PATENT AND TRADEMARK OFFICE
CERTIFICATE OF CORRECTION

PATENT NO.     : 6,498,117 B1
DATED          : December 24, 2002
INVENTOR(S)    : Andre Beyrle and Daniel Dages It is certified that error appears in the above-identified patent and that said Letters Patent is hereby corrected as shown below:

Column 11,
Line 8, insert -- 20 -- after the word "of".

Signed and Sealed this

Fifteenth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,498,117 B1
DATED : December 24, 2002
INVENTOR(S) : Andre Beyrle and Daniel Dages It is certified that error appears in the above-identified patent and that said Letters Patent is hereby corrected as shown below:

Column 12,
Line 9, replace "906º C" with -- 900º C --.

Signed and Sealed this

Twenty-ninth Day of July, 2003

JAMES E. ROGAN
*Director of the United States Patent and Trademark Office*